(12) United States Patent
Al-Omari et al.

(10) Patent No.: US 8,224,806 B2
(45) Date of Patent: Jul. 17, 2012

(54) SELECTIVITY-BASED OPTIMIZED-QUERY-PLAN CACHING

(75) Inventors: Awny K. Al-Omari, Cedar Park, TX (US); Tom C. Reyes, Austin, TX (US); Robert M. Wehrmeister, Austin, TX (US); Ahmed K. Ezzat, Cupertino, CA (US); QiFan Chen, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 12/533,365

(22) Filed: Jul. 31, 2009

(65) Prior Publication Data

US 2011/0029508 A1 Feb. 3, 2011

(51) Int. Cl.
*G06F 7/00* (2006.01)
*G06F 17/30* (2006.01)

(52) U.S. Cl. .................. 707/713; 707/715; 707/718

(58) Field of Classification Search ............ 707/713, 707/715, 718
See application file for complete search history.

(56) References Cited

U.S. PATENT DOCUMENTS

| | | | | |
|---|---|---|---|---|
| 5,469,568 | A * | 11/1995 | Schiefer et al. ................ | 1/1 |
| 6,466,931 | B1 | 10/2002 | Attaluri et al. | |
| 6,801,905 | B2 * | 10/2004 | Andrei ........................... | 1/1 |
| 7,734,615 | B2 * | 6/2010 | Anderson et al. ............ | 707/713 |
| 7,958,113 | B2 * | 6/2011 | Fan et al. ...................... | 707/718 |
| 7,984,043 | B1 * | 7/2011 | Waas ............................. | 707/718 |
| 2003/0177137 | A1 * | 9/2003 | MacLeod et al. ............ | 707/102 |
| 2006/0167865 | A1 * | 7/2006 | Andrei ........................... | 707/4 |
| 2006/0224563 | A1 | 10/2006 | Hanson et al. | |
| 2007/0250470 | A1 * | 10/2007 | Duffy et al. .................. | 707/2 |
| 2007/0282794 | A1 | 12/2007 | Barsness et al. | |
| 2008/0091642 | A1 * | 4/2008 | Bestgen et al. .............. | 707/2 |
| 2008/0140622 | A1 * | 6/2008 | Bestgen et al. .............. | 707/3 |
| 2008/0183684 | A1 * | 7/2008 | Bestgen et al. .............. | 707/4 |
| 2010/0306188 | A1 * | 12/2010 | Cunningham et al. ...... | 707/713 |

OTHER PUBLICATIONS

Korean Intellectual Property Office, International Search Report, Aug. 31, 2010, 3 pages, Daejeon, Republic of Korea.

\* cited by examiner

*Primary Examiner* — Tony Mahmoudi
*Assistant Examiner* — Merilyn Nguyen

(57) ABSTRACT

Optimized query plans are partitioned into equivalence groups that each include equivalence classes. Each equivalence group corresponds to a particular compiled, normalized, and parameterized query plan prior to optimization. Each equivalence class within an equivalence group corresponds to a different query plan corresponding to the particular compiled, normalized, and parameterized query plan represented by the equivalence group that has been optimized with respect to the selectivity of one or more predicate clauses of the query that is compiled to produce the particular compiled, normalized, and parameterized query plan. Optimized query plans are cached according to their respective equivalence groups and equivalence classes. When a query, similar to a query already compiled, optimized, and cached, is subsequently received and compiled, a selectivity for a predicate of the compiled query is computed, allowing the database management system to retrieve a cached query plan optimized for a similar query with similar selectivity.

16 Claims, 16 Drawing Sheets column is selected by sizes of P and L

| | | |
|---|---|---|
| predicate has low selectivity<br><br>P is small<br>L is small<br><br>① | predicate has low selectivity<br><br>P is larger than small cost of sorting P is less than preparing a hash-based access<br><br>② | predicate has low selectivity<br><br>P is large cost of preparing hash access to P less than cost of sort<br><br>③ |
| predicate is highly selective<br><br>P is small<br>index on L.state<br><br>④ | predicate is highly selective<br><br>P is larger than small cost of sorting P is less than preparing a hash-based access index on L.state<br><br>⑤ | predicate is highly selective<br><br>P is large cost of preparing hash access to P less than cost of sort index on L.state<br><br>⑥ | row is selected by predicate selectivity and presence of index

Figure 5

SELECTIVITY-BASED OPTIMIZED-QUERY-PLAN CACHING

TECHNICAL FIELD

The present invention is related to database management systems.

BACKGROUND

Many database management systems, including relational database management systems that process structured-query-language ("SQL") queries, compile queries submitted to the database management system into an intermediate form, optimize the intermediate forms, and instantiate the compiled queries to produce query plans that are executed by a query-processing engine to store data and modify data already stored in the database management system and to retrieve data from the database management system. Query compilation and compiled-and-optimized-query instantiation are relatively straightforward operations, but query optimization can be computationally expensive. In order to decrease computational overheads and increase the rate of query processing, certain database management systems store compiled and optimized queries, or optimized query plans, in a memory cache, using a process referred to as "query-plan caching," so that cached optimized query plans may be matched to subsequently received queries, retrieved from cache, and reused to avoid the expense of carrying out compiled-query optimization. Unfortunately, the process of matching subsequently received queries to cached optimized query plans may be difficult mid inaccurate, as a result of which subsequently received queries may be inadvertently matched with inappropriate and non-optimal cached query plans, in turn leading to query-processing efficiencies and in worst cases, degradation in query-processing throughput and computational efficiencies with respect to database management systems that do not cache optimized query plans. Researchers and developers working in the field of database management systems, manufacturers and vendors of database management systems and associated hardware, and ultimately, users of database management systems continue to seek improved methods and systems for optimized-query-plan caching in order to achieve greater efficiencies in query processing.

BRIEF DESCRIPTION OF THE DRAWINGS

FIG. 5 indicates parameters and characteristics that favor selection of each of the six alternative, optimized query plans.

DETAILED DESCRIPTION

Certain embodiments of the present invention are described, below, in the context of a relational database management system. It should be noted, at the onset, that the present invention may be applied to a variety of different types of database management systems, in addition to relational database management systems, as well as query-processing systems that are not traditionally regarded as database management systems.

Figure 1:
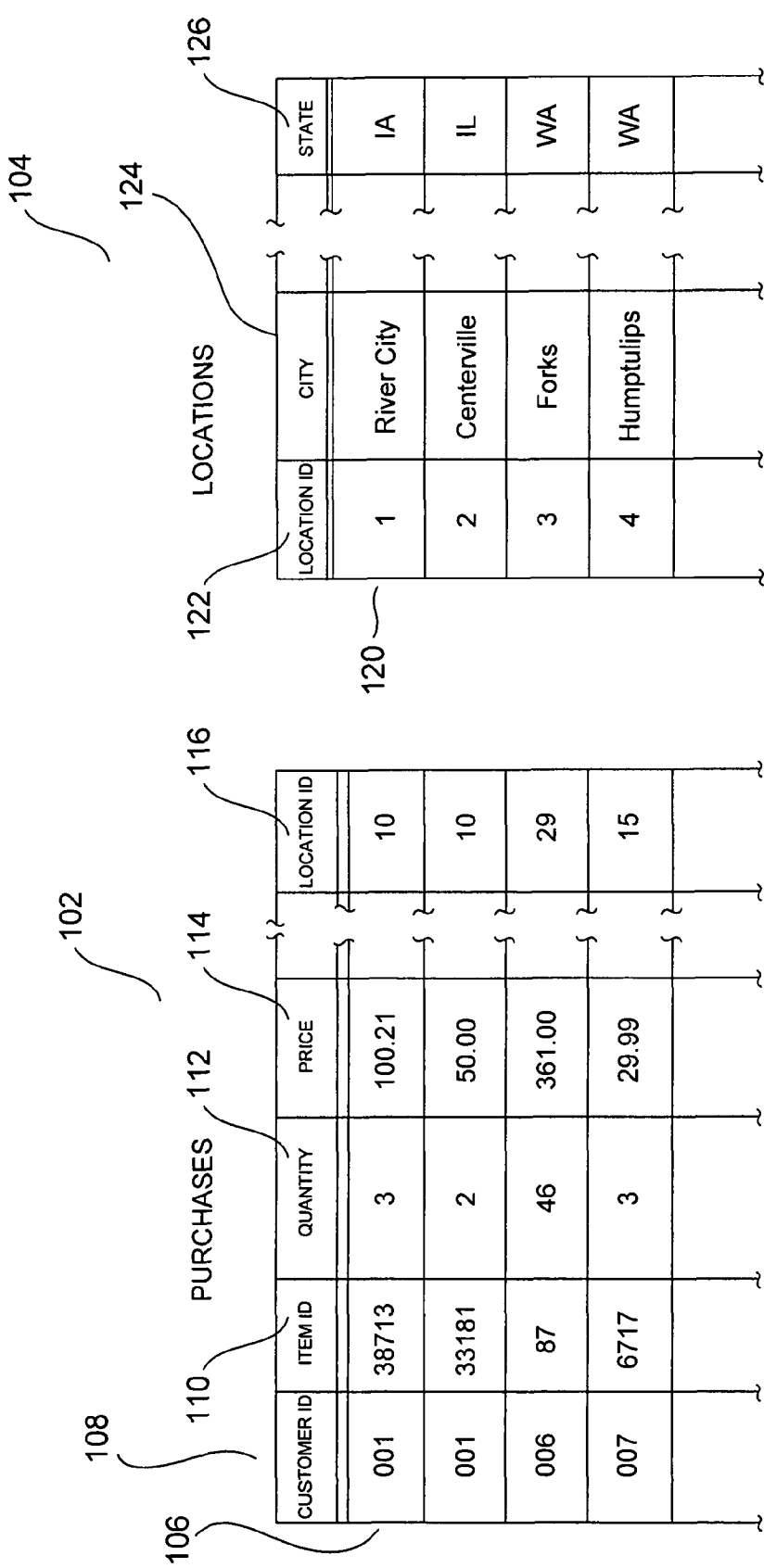
FIG. 1 illustrates two relational-database tables.

FIG. 1 illustrates two relational-database tables. The tables include a first table 102, named "Purchases," and a second table 104, named "Locations." Relational-database tables are convenient abstractions of data sets stored in a relational database management system, providing a data-storage basis for use of the relational algebra, which facilitates query compilation and query optimization. In general, the data is not stored in two-dimensional tables with rows and columns on mass-storage devices or in electronic memory of computer systems, but is instead stored according to a variety of data-storage methodologies that involve organizing and optimizing the storage of data across both electronic-memory caches and multiple mass-storage devices in order to provide efficient access and update, high availability, and fault tolerance. For the purpose of describing the present invention, the many details regarding electronic storage of data abstractly viewed as relational-database tables are not needed, and are therefore not described further in the current discussion.

The relational tables each contain rows, such as row 106 of the table "Purchases," and columns, such as column 108 of the table "Purchases." Each row in a relational-database table is equivalent to a formatted record, and each column represents one of the various fields contained in each record. In the table "Purchases," for example, the first row 106 is essentially a record representing a purchase, containing: (1) an identifier "001" of the customer who made the purchase; (2) an identifier "38713" of the item that was purchased; (3) the quantity "3" of items purchased; (4) the price "$100.21" of each of the three purchased items; (5) one or more additional numeric or alphanumeric values corresponding to one or more additional columns; and (6) a location identifier "10" that identifies the location to which the purchase was shipped. The names of the fields for each record, or, equivalently, the names of the columns in the Purchases table, include: (1) "customerID" 108; (2) "itemID" 110; (3) "quantity" 112; (4) "price" 114; (5) one or more additional unspecified column names; and (6) "locationID" 116. Similarly, each row, such as row 120, in the table "Locations" describes a location to which a purchase has been sent. The fields describing locations, or, equivalently, the names of the columns of the table "Locations," include: (1) "locationID" 122, (2) "city" 124; (3) one or more additional unspecified columns; and (4) "state" 126. If it is desired to know the state to which the purchase represented by the first row 106 in the table "Purchases" was sent, the locationID value "10" stored in the first row of the table "Purchases" is used to find a row in the table "Locations" having the same locationID value, and the indication of the state in that row of the table "Locations" indicates the state to which the purchase represented by row 106 in the table "Purchase" was sent. Similarly, information about the customer who made the purchase represented by row 106 in the table "Purchase" can be presumably found by identifying a row in a third table "Customers," not shown in FIG. 1, with a customerID value equal to the customerID value "001" included in the first row 106 of the table "Purchases." The information stored in a relational database is carefully organized into multiple relational tables according to one or more normalization schemes to provide efficient data storage, update, and access. By storing the location information, for example, in a different table from the purchase information, a single record defining a particular location can be referenced from multiple purchase records, rather than redundantly including the location information in each purchase record.

Figure 2:
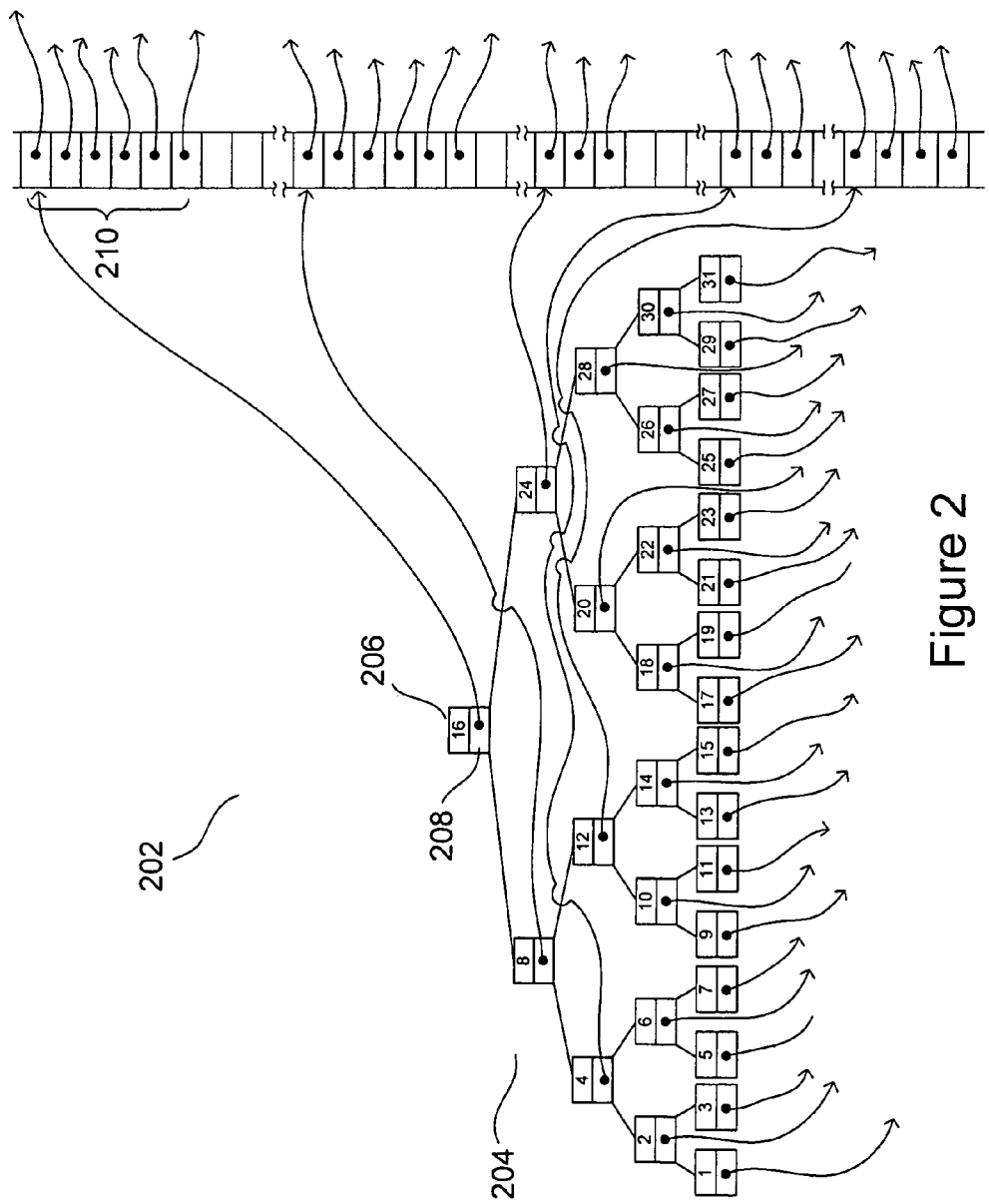
FIG. 2 provides an abstract representation of a relational-database index.

In addition to tables, a relational database may also include indexes. FIG. 2 provides an abstract representation of a relational-database index. Assuming that the table "Locations" contains 31 different location records sequentially identified by locationID values "1," "2," ... "31," the index 202 shown in FIG. 2 can be used to index ad of the different locationID values in mw contained in the table "Purchases." The 31 different possible locationIDs are contained in a binary tree 204 with root node 206. Each node in the binary tree specifies a different possible locationID value and includes a reference, such as reference 208 in node 206, to a list of references, such as the list of reference 210 corresponding to reference 208 in node 206, to rows in the table "Purchases" that include a particular locationID value. In FIG. 2, six different rows of the table "Purchases" include the locationID value "16," represented by binary-tree node 206. The references in the reference list 210 point to each of these rows. The index shown in FIG. 2 allows purchases shipped to particular destinations to be quickly identified, using the index, rather than requiring the entire "Purchases" table to be scanned in order to identify those records that specify the particular destination. Indexes are particularly useful for tables of medium-to-large sizes. Because there is significant overhead in creating and managing indexes, for very small tables, a table scan is generally more efficient than creating and managing an index and then accessing particular rows using the index. Tables are often laid out, on mass-storage devices, to facilitate efficient scans, while index-based access requires multiple random accesses to memory and/or mass storage. However, when a relational table is large, and only a few records need to be located, index-based access is generally far more efficient.

The following query, expressed in SQL, is an example of a relatively simple query that might be executed with respect to the two relational tables shown in FIG. 1:

```
SELECT SUM (price * quantity)
FROM Purchases P, Locations L
WHERE        (P.locationID = L.locationID) AND
             (L.state = 'NY');
```

This query returns the sum of the purchases sent to locations in the state of New York. The language following the SQL keyword "WHERE" is both a predicate clause as well as a specification of a join operation, as discussed below. The join operation, specifically a natural-join operation, join together the tables "Purchases" and "Locations" to create a larger table from which records representing purchases sent to New York are selected, with the price and quantity values multiplied, for each record, and then summed to produce the final result. Those familiar with SQL can immediately understand the query from the uncompiled query text.

Figure 3:
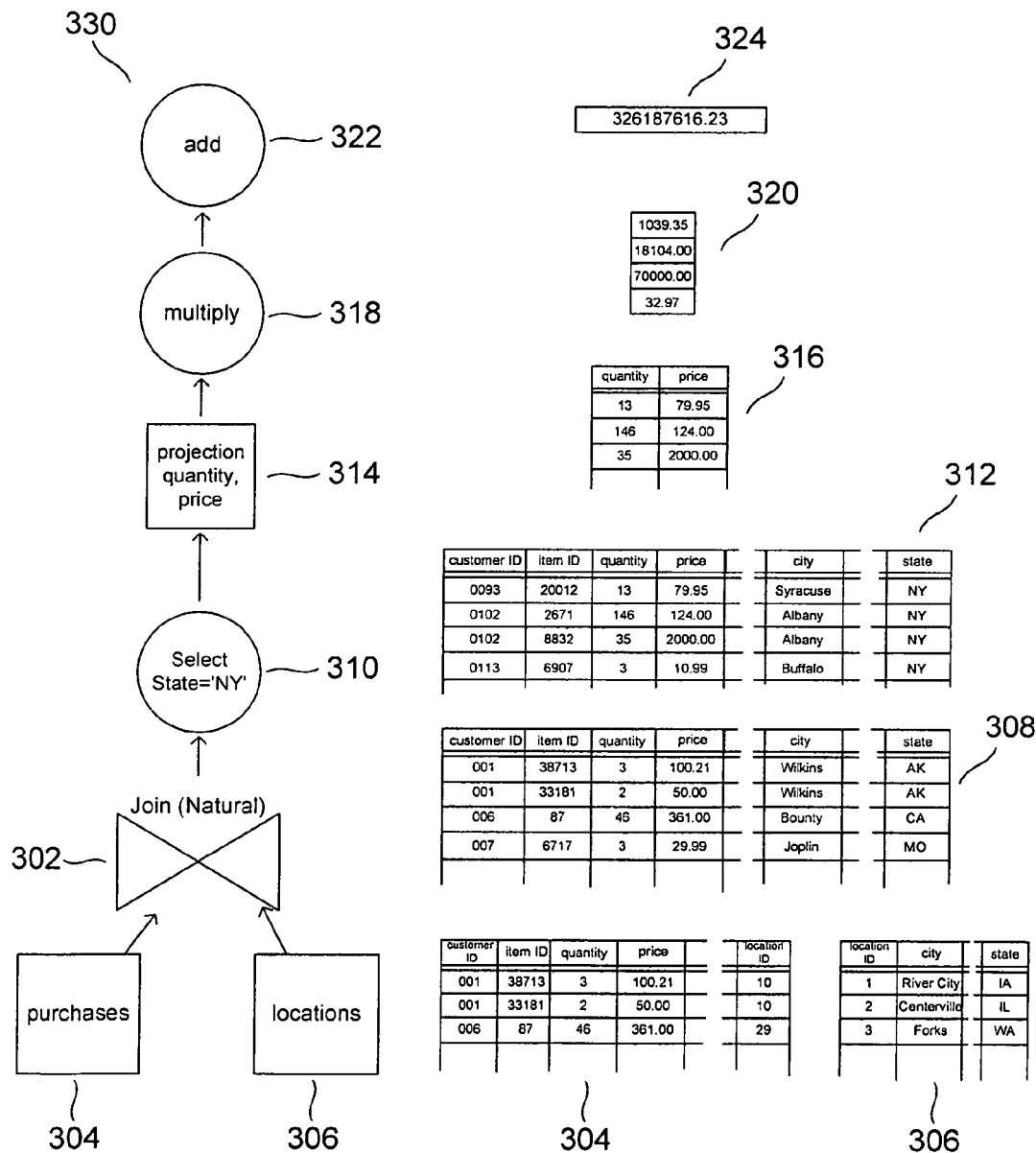
FIG. 3 illustrates an abstract query plan prepared from the example SQL query.

Query-processing engines and computer programs, however, do not immediately acquire semantic understanding of the query text. Instead, they compile the query into a query plan that can be abstractly viewed as a query tree with nodes representing well-defined operations that can be executed by a query-processing engine. FIG. 3 illustrates an abstract query plan prepared from the example SQL query. The query text "WHERE (P.locationID=L.locationID) specifies a natural join operation 302 in which the tables "Purchases" 304 and "Locations" 306 are combined together to produce a single, abstract table 308, with rows having identical values of locationID field in the two tables combined to eliminate the locationID columns in both tables. The query language "WHERE (L.state='NY') specifies a SELECT operation 310 which selects only those rows, from the combined table 308, with the value "NY" in the field "state," producing a result table 312 with generally fewer rows. The query language SELECT SUM (price*quantity) is decomposed, by query compilation, into a projection operation 314, which selects only the "quantity" and "price" columns from the result table 312 to produce the narrower result table 316, a multiply operation 318, which multiplies the two values in each row of the narrow table 316 to produce an even narrower result table 320 with a single value in each row, and a SUM operation 322 which adds all of the values in the single column of the narrowest table 320 to produce a single scalar value 324 which represents the total sum of all purchase prices of purchased items that were sent to the state of New York. In FIG. 3, an abstract representation of the query plan 330, represented as a tree, is shown together with depictions of the resultant, abstract tables produced by each operation represented by a node in the query plan.

Figure 4:
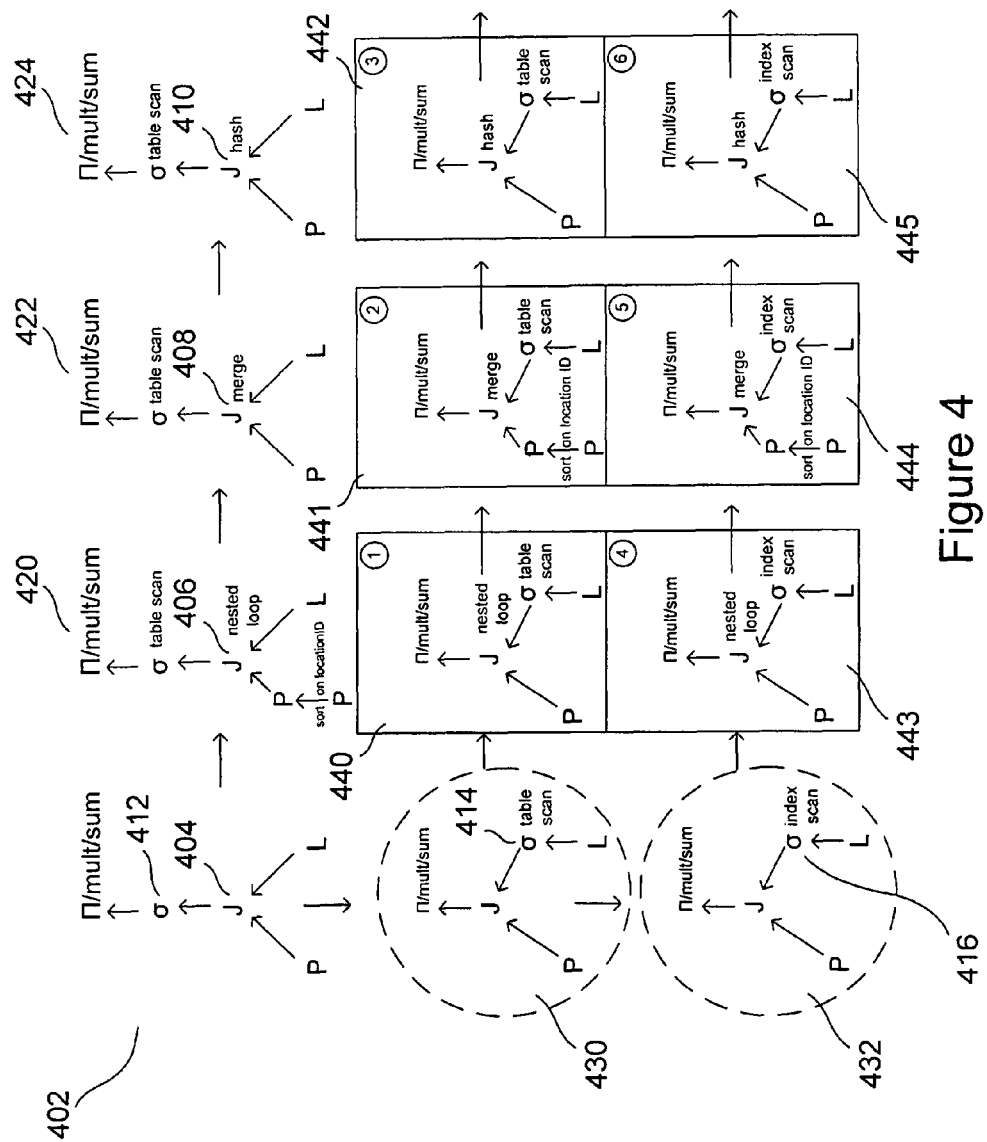
FIG. 4 illustrates query-plan optimization.

The initial query tree (330 in FIG. 3) produced by query compilation is often non-optimal, with regard to execution time and computational overhead. For that reason, an initial query plan is generally optimized by a database management system to produce an optimal query plan. FIG. 4 illustrates query-plan optimization. In FIG. 4 the initial query plan 402 is shown, in a more concise form than in FIG. 3, at the upper left-hand corner of the figure. Eleven alternative query plans, all of which produce the same query result, are also shown in FIG. 4. In the initial query plan 402, the join operation 404 is generic. However, there are a variety of different specific algorithms for computing a nested join. These algorithms include a nested-loop join operation 406, a merge-join operation 408, and a hash-join operation 410, each of the specific join algorithms giving rise to a different, fully specified query plan 420, 422, and 424. In addition, the SELECT operation 412 in the initial query plan 402 is generic. There are a variety of different ways of carrying out the SELECT operation, including a full table scan 414 and an index-based table selection 416. Each of the final three query plans 420, 422, and 424 in the first row are fully specified. However, the query plans 402, 420, 422, and 424 in the first are non-optimal. In general, it is best to carry out join operations as late as possible in the overall query plan, so that result tables with fewer rows end up being joined together by the join operations. To that end, in each of the optimized but not fully specified query plans 430 and 432, the tree is restructured so that the select operation 414 and 416 is carried nut first on the table "Locations" prior to execution of the join operation. The six query plans 440-115 represent six different optimized and fully specified query plans. These query plans are referred to as query plans 1, 2, 3, 4, 5, and 6. Query optimization involves generating and evaluating a variety of alternate query plans, such as those shown in FIG. 4, and selecting one of the various alternative query plans by computing an estimated execution efficiency for each of the alternative query plans and selecting the query plan with greatest estimated efficiency.

A nested-loop join is an algorithmically simple join operation in which one table is scanned, row by row, and for each row in this first table, the second table is completely scanned in order to identify all possible rows of the second table that match a currently considered row in the first table with respect to the values of one or more join columns. While algorithmically simple, the nested join is computationally expensive for all but relatively small tables. A merge join in employing tables already sorted on a join column in order to short circuit the need for repeatedly scanning the tables. The hash join prepares a hash table for the smaller of the two tables being joined, or inner table, to facilitate rapid identification of all rows in the inner table having the join-column value of each row in the larger of the two tables during a table scan of the larger table. A hash join is fast for very large tables. Query plans 1, 2, and 3 (440-442 in FIG. 4) all use a table-scan-based SELECT operation, while query plans 4, 5, and 6 (443-445 in FIG. 4) all use an index-based SELECT operation. As discussed above, a table scan may be more computationally and time efficient for small tables, while an index scan may be more computationally efficient and time efficient for large tables. Furthermore, when the selectivity of the predicate that specifies the SELECT operation, in the current example query the statement "WHERE (L.state='RI')," is high, meaning that relatively few rows are selected with respect to the table size according the predicate clause, an index scan may be far more efficient than a table scan. On the other hand, when the selectivity of the predicate is low, meaning that a relatively large number of rows are selected with respect to the table size, the table scan may be more efficient. In the current example, presuming that because of the large population of New York, a relatively large fraction of purchases are sent to destinations in New York, the selectivity of the example query is relatively low. However, the selectivity of the predicate of a query for computing the total amount of purchases sent to the state of Rhode Island may, by contrast, be relatively high. The query optimizer component of a database management system generally considers many different characteristics and parameters, including table sizes, predicate selectivities, whether or not indexes have already been created for particular columns of tables, and other such factors when choosing a final, optimized query plan from among many possible alternative query plans.

For the simple example query, provided above, and for the six optimal, alternative query plans shown in FIG. 4, FIG. 5 indicates parameters and characteristics that favor selection of each of the six alternative, optimized query plans. As shown in FIG. 5, the choice between query plans 1, 2, and 3 versus query plans 4, 5, and 6 generally involves determining whether or not the predicate for the select operation is of low or high selectivity, respectively, while the choice between query plans 1 and 4, 2 and 5, and 3 and 6, which differ from one another in the particular type of join operation used, is made largely based on sizes of the two tables "Purchases" and "Locations."

Figure 6:
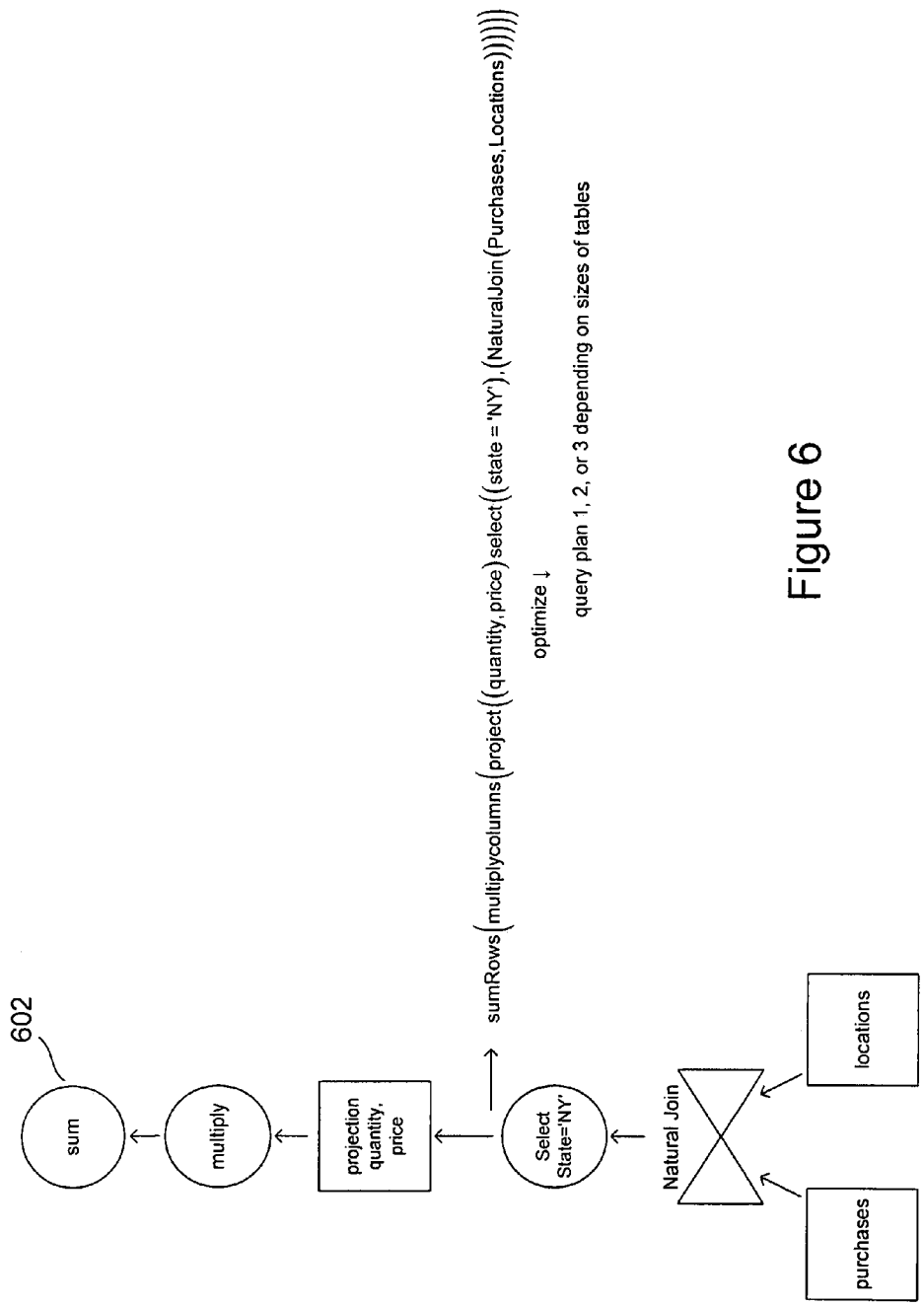
FIG. 6 illustrates additional details regarding query optimization.

FIG. 6 illustrates additional details regarding query optimization. As shown in FIG. 6, the abstract, tree-like query plan 602 initially produced by query compilation in an exemplary database management system may be equivalently expressed as a text string 604 to facilitate optimization. The equivalent text string, shown in FIG. 6, is a hypothetical equivalent text representation of the query plan, and does not correspond to any textual representation of the query plan employed by an actual database management system. The text string is then optimized to produce a final, optimized query plan, also expressed as a text string. In the text-string equivalent of the abstract, tree-like query plan, certain characters, such as the characters 'NY' that stand for the state of New York, are identified as literals by virtue of being enclosed in single quotes. Other types of literals include specific numeric values.

Next, a slightly different exemplary query is considered:

```
SELECT SUM (price * quantity)
FROM Purchases P, Locations L
WHERE          (P.locationID = L.locationID) AND
               (L.state = 'RI');
```

Figure 7:
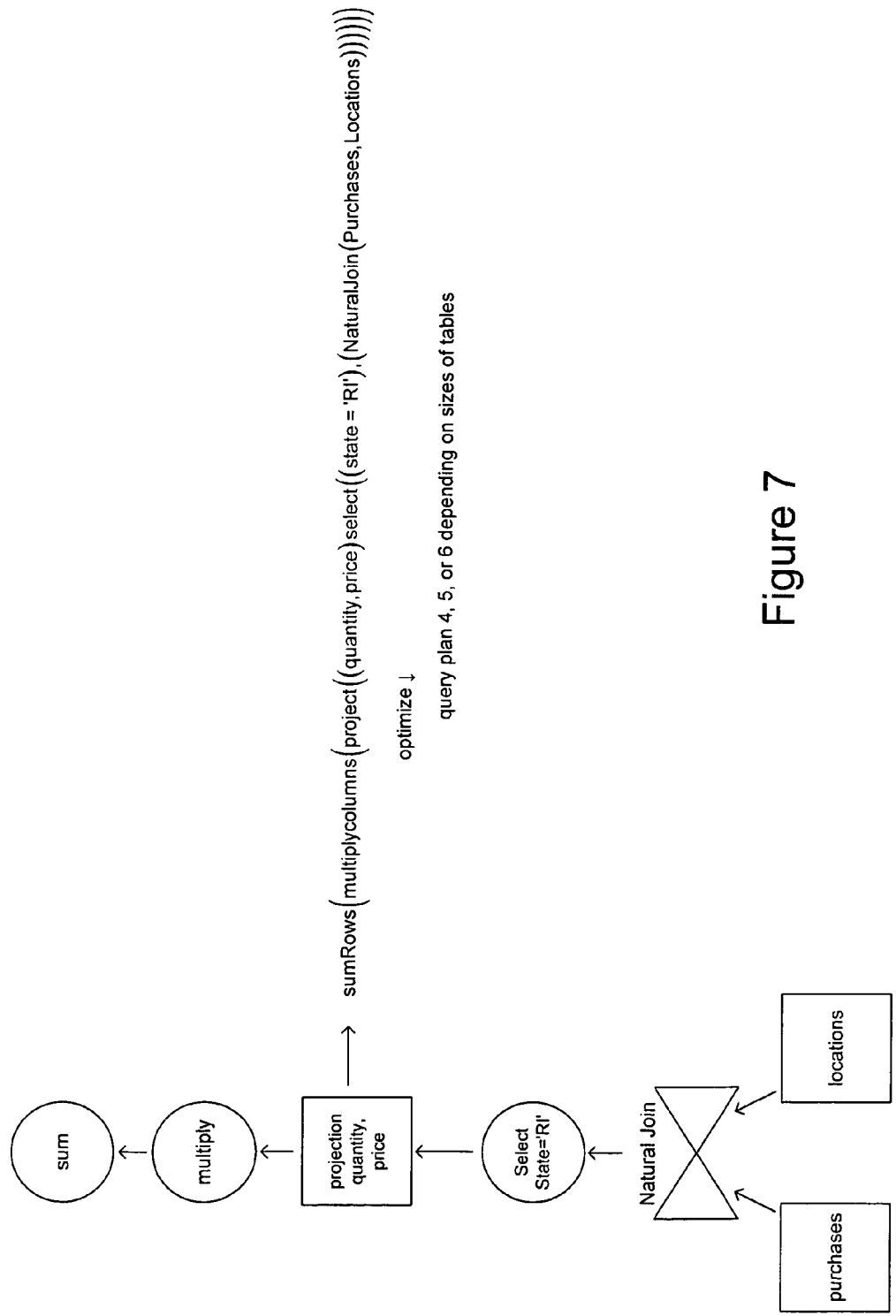
FIG. 7 shows an abstract query-plan tree and textual representation of the query plan for a second exemplary query, using the same illustration conventions as used in FIG. 6.

This query is nearly identical to the first exemplary query, except for the fact that the total value of purchases sent to the state of Rhode Island is specified by the query rather than the total value of purchases sent to the state of New York, in the first exemplary query. FIG. 7 shows an abstract query-plan tree and textual representation of the query plan for the second exemplary query, using the same illustration conventions as used in FIG. 6. The second query plan differs from the first query plan only in the value of the literal specifying the state for which the total value of purchases is to be calculated. However, because the selectivity of the literal 'NY' is relatively low, in the first exemplary query, optimization generally chooses one of query plans 1, 2, or 3, while, in the case of the second exemplary query, the literal 'RI' has relatively high selectivity, presuming that purchases are distributed with a frequency that strongly correlates with state population, and therefore one of optimal query plans 4, 5, orb are generally chosen by the optimizer, particularly when an index on locationID has already been created for the table "Locations."

The textual representation of both the first and second example queries can be parameterized by replacing the literal, in both cases, with a parameter "_P1" to produce the parameterized textual query plan:

sumRows(multiplyColumns(project((quantity, price), select((state=_P1), (Natural Join (Purchases, Locations))))))

The parameterized version of the query plan is the same for both of the two different example queries. Each of the two specific example queries can be generated by replacing the parameter "_P1" with either the character string 'NY' or 'RI'

Figure 8:
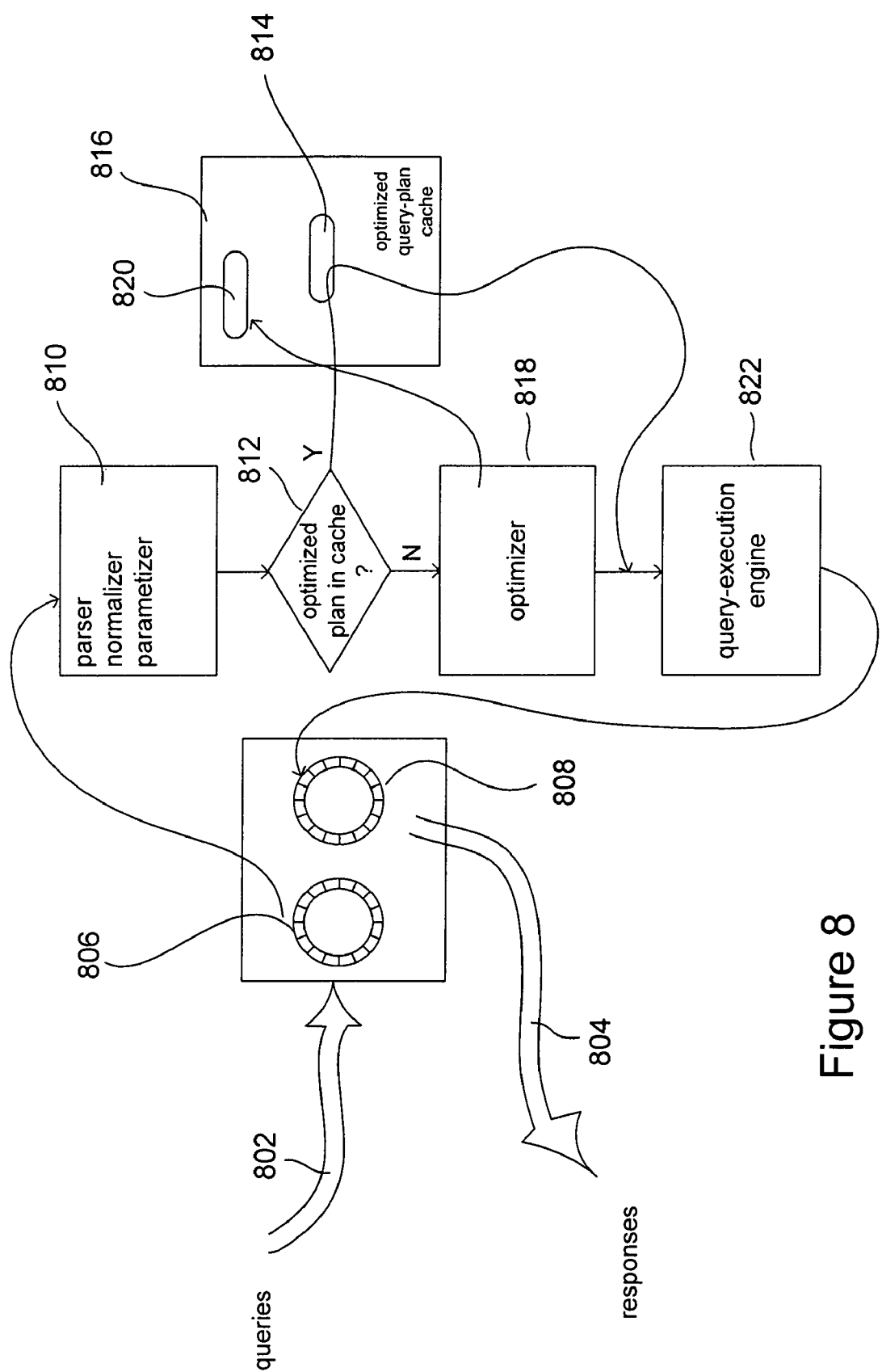
FIG. 8 illustrates optimized-query-caching for a database management system.

FIG. 8 illustrates optimized-query-caching for a database management system. In FIG. 8, a database management system receives queries 802, executes, the queries, and returns responses 804 to those queries. Incoming queries are queued to an input queue 806 and responses are queued to an output queue 808. The query processing system is shown, in FIG. 8, in control-flow-diagram-like fashion. A next query is dequeued from the input queue 806, and parsed, normalized, and parameterized 810. When the parameterized query has previously been received and optimized, as determined in step 812, it is desirable to fetch the corresponding optimized query plan 814 from an optimized query-plan memory cache 816 rather than to redundantly can out the expensive query-plan optimization process discussed above with reference to FIG. 4. However, when the parameterized query plan has not been previously encountered, the query plan needs to be optimized, in step 818. The optimized query plan can then be stored 820 in an optimized query-plan cache to avoid again optimizing the gum should the parameterized query be again received by the database management system. In either case, the optimized query plan is executed by a query-execution engine 822 and the results returned to the output queue 808. Were non-parameterized query plans cached by the database management systems, then query optimization can only be avoided in the case that the exact same query is again received by the database management system. However, considering the two previously discussed exemplary queries, which differ only in the value, of a literal, both exemplary queries produce the same set of alternative optimized query plans upon optimization. Thus, it would be reasonable to expect that by caching parameterized optimized query plans, the expensive step of optimization might be avoided in the case that non-identical, but similar, queries are subsequently received. However, as discussed above with reference to FIGS. 6 and 7, even though the two example queries are nearly identical, because of the selectivities of the predicates of the two example queries differ significantly, the query optimizer chooses one of a different set of alternative optimized queues of the two example queries. Were the parameterized and optimized query plan for the first example query chosen by the query optimizer for caching, then, when the second query is received, parsed, normalized, and parameterized, the optimized query plan for the first example query would be retrieved from the optimized query-plan cache and used for execution of the second query. However, using the optimized query plan generated for the first example query for executing the second example query is non-optimal, since, were the query plan for the second query to be optimized, a different optimal query plan would be chosen.

Embodiments of the present invention seek to gain the efficiencies of caching parameterized and optimized query plans but, at the same time avoid the risk of using non-optimal cached optimized query plans in the case that a subsequent query differs, in predicate selectivity, from an initial query that is optimized to produce an optimized query plan that is cached, in the optimized query-plan cache, for the parameterized query corresponding to both the original query and the subsequently received query. Embodiments of the present invention include the selectivity of query predicates as a dimension in the analysis carried during storing and retrieving of optimized query plans.

Figure 9:
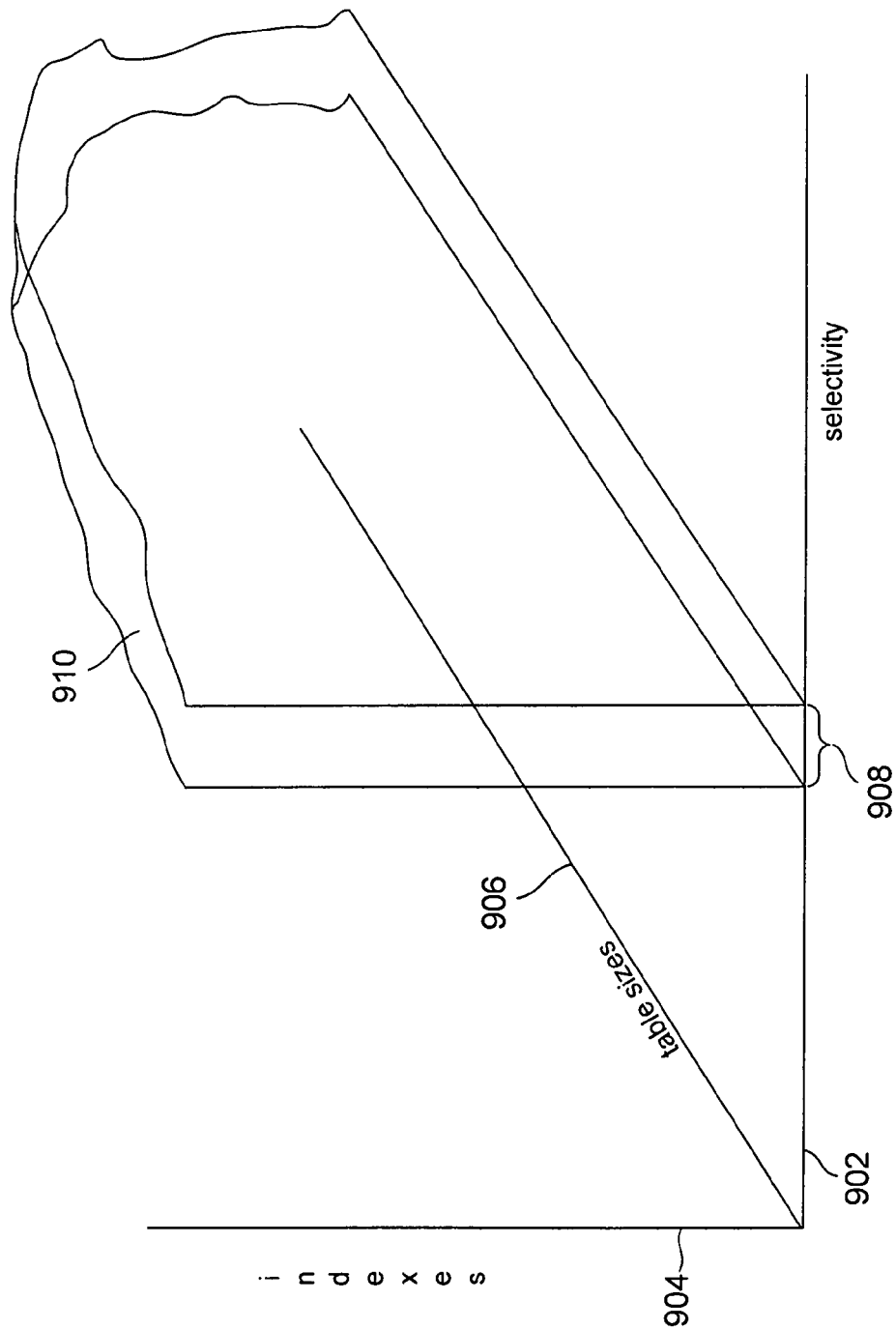
FIG. 9 illustrates a dimensional view of optimized-query-plan caching and retrieval according to embodiments of the present invention.

FIG. 9 illustrates a dimensional view of optimized-query-plan caching and retrieval according to embodiments of the present invention. Selection of an optimal query plan from various possible alternative optimized query plans 1, 2, 3, 4, 5, and 6, discussed with reference to FIG. 4, depends on the absence or presence of indexes, on table sizes, and on the selectivity of the predicate, as discussed with reference to FIG. 5. In FIG. 9, the selectivity of the predicate is regarded as a first dimension 902, the presence of indexes is regarded as a second dimension 904, and table sizes are regarded as a third dimension 906 of a decision space. Regardless of difference in table sizes or the presence or absence of indexes, different values in the selectivity of predicates can be viewed as defining different, non-overlapping volumes in the decision space. For example, when the selectivity of the predicate of a particular parameterized query falls in the ramie 905, then those alternative optimized query plans within a slice 910 of the total volume of the decision space are optimal for the parameterized query, a final optimal query plan for a query selected from the slice by consideration of the other dimensions. Other selectivity ranges may specify other slices, or sub-volumes, of the decision space. The different slices, or sub-volumes, specified by different ranges of selectivities, can be regarded as equivalence classes. In other words, a first set of alternative, optimized query plans for a particular parameterized query may correspond to a first equivalence class specified by a range of selectivity values, a second set of alternative, optimized query plans may correspond to an equivalence class specified by a second range of selectivity values and so on. In this fashion, the optimized query-plan cache needs to store, at most, a set of alternative optimized query plans for each equivalence class. Referring back to table 4, the three fully specified query plans 1, 2, and 3 (440-442 in FIG. 4) all correspond to optimized, but not fully specified, query plan 430, while the three optimized, fully specified query plans 4, 5, and 6 (443-445 in FIG. 4) all correspond to optimized, but not fully specified, query plan 432. In order to provide a better optimized-query-plan caching mechanism, in certain embodiments of the present invention, the optimizer produces optimized but not fully specified, query plans, such as query plans 430 and 432, for storage in the cache, leaving specification of the join operation as a post-optimization, or second-level, optimization task that can be carried out after an optimized query plan is retrieved from the optimized query-plan cache. In this case, only a single optimized, but not fully specified, query plan needs to be stored for each equivalence class based on a particular range of predicate selectivities.

The two example queries each contain a single literal, so that determining the selectivity of the predicate is easily accomplished by determining the selectivity of each literal value, in both cases, within the context of the query. Database queries tend to be far more complicated, in many cases, than the example queries discussed above. Predicates involve multiple literals, and queries may even contain multiple predicates. In certain embodiments of the present invention, multiple literals and/or multiple predicates may be mapped to a vector of selectivities. The vectors of selectivities of already cached query plans are compared, element-by-element, to the vector of selectivities of a newly query to determine whether or not a cached query plan can be used for execution of the newly-received query.

In some cases, a generalized query plan can be cached and reused for a subsequently-received query similar to the query from which the generalized caches query plan was generated. First, consider the following example query:

```
SELECT SUM (price * quantity)
FROM Purchases P, Locations L
WHERE       (P.locationID = L.locationID) AND
            (L.state = 'RI') OR (L.state = 'DE'));
```

There are two literals, 'RI' and 'DE,' in this query. However, both literals are joined by a Boolean "OR" operation and together specify a single overall selection criterion. In this case, assuming selectivity correlates with state population, the selectivity of the predicate may be confidently assigned as high, since both Rhode island and Delaware are small states, and their combined population is still small with respect the entire country. Next, consider the following example query:

```
SELECT SUM (price * quantity)
FROM Purchases P, Locations L, Customers C
WHERE       (P.locationID = L.locationID) AND
            (L.state = 'RI') AND
            (C.customerID = P.customerID) AND
            (C.type = 'large publicly held corporation');
```

In this example query, the predicate is rather complex, and involves the two different literals 'RI' and 'large publicly held corporation.' It may be the case that all possible literal values for the field "C.type" are generally of very low selectivity, and can therefore be disregarded with regard to parameterized, optimal query-plan caching. It may be the case, in this example, that queries can be confidently assigned to selectivity-based equivalence classes by considering only the literal value for state identifier. Thus, while the methods of the current invention apply straightforwardly to single-literal queries, such as the first two example queries, the methods and systems of the present invention may find wider application to larger sets of queries for which selectivities can be confidently assigned, despite the presence of multiple predicates and/or literals.

As discussed above, query compilation involves generating a tree-like query plan or an equivalent textual query plan, as discussed above with reference to FIGS. 6 and 7, from a query-language statement, such as an SQL query. Parsing of the query involves recognizing the various syntactic structures within the query and transforming the query into an ordered sequence of query-processing-engine operations. In query compilation, names of tables, indexes, and other database objects are bound to database objects, so that the various operations are executed with respect to database objects by the query-processing engine. Normalization involves transforming various alternative forms of both queries and query plans into a common normalized form so that the various different ways of expressing a query and a query plan are funneled into a single representation. As one example, the following two SQL queries specify the same initial query plan and the same final optimized query plan:

```
SELECT SUM (price * quantity)
FROM Purchases P, Locations L
WHERE        (P.locationID = L.locationID) AND
             (L.state = 'NY');
SELECT SUM (price * quantity)
FROM Purchases NATURAL JOIN Locations
WHERE (L.state = 'NY');
```

As another example, the following two text representations of query plans are equivalent, differing only in ordering of arguments for the natural-join and project functions:

sumRows(multiplyColumns(project((quantity; price) select((state=_P1). (Natural Join (Purchases, Locations))))))

sumRows(multiplyColumns(project((price, quantity), select((state=_P1), (Natural Join (Locations, Purchases))))))

Normalization generally involves applying various rules for reordering and restructuring equivalent queries and equivalent query plans to produce a single, final, arbitrary form.

Figure 10:
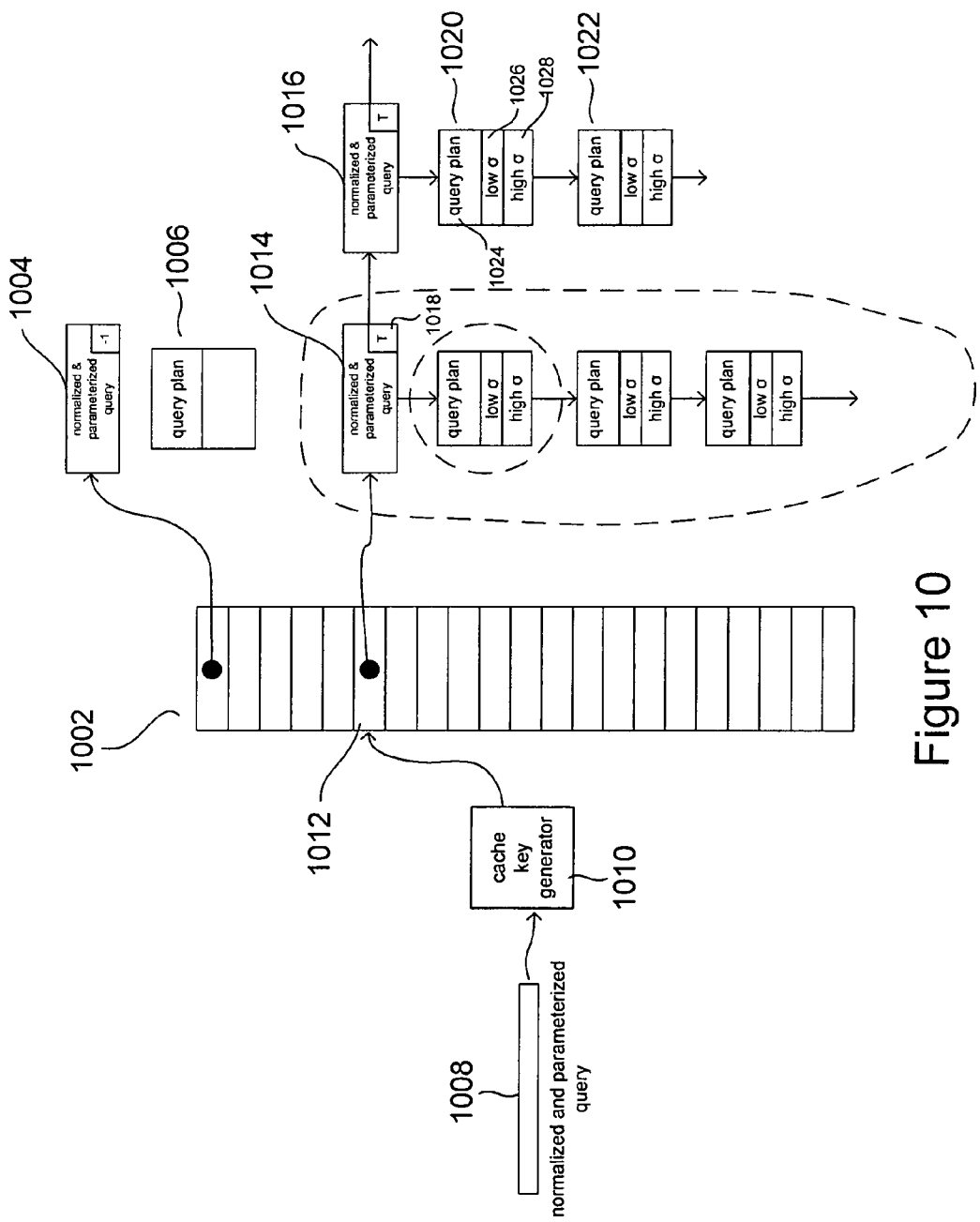
FIG. 10 illustrates an optimized-query-plan caching structure that represents one embodiment of the present invention.

FIG. 10 illustrates an optimized-query-plan caching structure that represents one embodiment of the present invention. FIG. 10 shows various memory-resident data structures by which an optimized-query-plan cache is organized. These structures include a cache-key table 1002, each entry of which references an equivalence group node ("egn"), such as egn 1004. Each egn, such as egn 1004, in turn references an equivalence-class node ("ecn"), such as ecn 1006 referenced from egn 1004. A normalized and parameterized query plan 1008 is submitted to a cache-key generator 1010 to generate a cache key corresponding to the normalized and parameterized query plan. The cache key is used as an index into the cache-key table 1002 in order to obtain a reference to an egn that may correspond to the normalized and parameterized query plan. In many embodiments of the present invention, the cache-key generator is a cryptographic hash function that generates a cryptographic hash of the normalized and parameterized query; the hash value then used as an index into a table of entries indexed by hash values 1002, each entry including a reference to an egn. Because the hash of a normalized and parameterized query plan is generally much shorter than a normalized and parameterized query plan, when both the hash value and the query plan are considered as binary numbers, there is a small chance that two different normalized and parameterized query plans may generate a common hash value. This is referred to as a hash collision. As a result of this phenomenon, a hash-table entry may reference more than one egn. For example, in FIG. 10, hash-table entry 1012 references a first egn 1014 that is linked to a second egn 1016. Each egn represents a distinct and different normalized and parameterized query plan. In fact, in the embodiment discussed below, each egn includes a copy of the normalized and parameterized query represented by the egn. In certain embodiments of the present invention, each egn also contains a threshold value, such as threshold value 1018, discussed in greater detail below. In alternative embodiments of the present invention, a single threshold value is used for all egns, and therefore an egn need not contain a threshold value. Each ecn, such as ecn 1020, represents a selectivity-based equivalence class that is a member of the equivalence group represented by the egn found at the head of the list of eons containing the ecn. Thus, in FIG. 10, ecns 1020 and 1022 represent two different selectivity-based equivalence classes associated with the equivalent selectivity-based equivalence group represented by egn 1016. In the discussed embodiment of the present invention, each ecn contains an optimized query plan 1024, a low-selectivity, or lowσ, value 1026, and a high-selectivity value, or highσ, 1028. The lowσ and highσ fields indicate the range of selectivities that define the equivalence class represented by the containing ecn.

According to embodiments of the present invention, normalized and parameterized query plans correspond to equivalence groups for purposes of optimized-query-plan caching. When the optimizer generates different optimized query plans based on different predicate selectivities of particular instances of queries corresponding to a normalized and parameterized query plan, different alternative parameterized and optimized query plans are each associated with an equivalence class within the equivalence group corresponding to the normalized and parameterized query. Thus, the optimized-query-plan caching strategy that represents an embodiment of the present invention is capable of retrieving optimal query plans for queries that differ in predicate selectivities. For example, both of the example queries, discussed above, are compiled to produce a single normalized and parameterized query plan in which the literals 'NY' and 'RI' are replaced with the parameter "_P1." However, as discussed above, the different selectivities of the literals 'NY' and 'RI,' in the context of the database containing tables "Purchases" and "Locations" as well as in the context of the strong correlation of state population with the number of purchases sent to that state, result in selection of a different, optimal query plan for the normalized and parameterized query with the parameter replaced with the literal 'RI' than for the normalized and parameterized query with the parameter replaced with the literal 'NY.'. According to the present invention, these two different optimal query plans are stored in two different ecns referenced from the egn that represents the common normalized and parameterized, query plan. In alternative embodiments of the present invention, the linked-list structures of egns and ecns may be alternatively implemented using variable-sized records or other, alternative data structures stored in memory, or alternative memory structures or representational conventions. The optimal-query-plan cache data structures may reside entirely in electronic memory or may be distributed between electronic memory and mass storage.

In certain embodiments of the present invention, query plans may be considered cacheable or not cacheable, depending on the complexity of the query plans and the likelihood of the query being submitted repeatedly to the database management system. Cacheable query plans may be further subdivided into query plans that can be cached according to selectivity, according to the present invention, and query plans that cannot be cached according to selectivities. Query plans that are not cacheable according to selectivity may nonetheless be cached using a single egn and ecn, such as egn 1004 and ecn 1006 in alternative embodiments, cache-key-table references point directly to lists of cached optimized query plans.

FIGS. 11A-F provide control-flow diagrams for an optimal-query-plan caching system within a database management system that represents one embodiment of the present invention. These control-flow diagrams represent a method and system based on the data structures discussed above with reference to FIG. 10. Alternative method-and-system embodiments of the present invention can be implemented for alternative data structures for optimal-query-plan caching, as well as for alternative organizations of cached optimized query plans that do not employ formal data structures, instead simply storing optimized query plans in consecutive memory blocks.

Figure 11A:
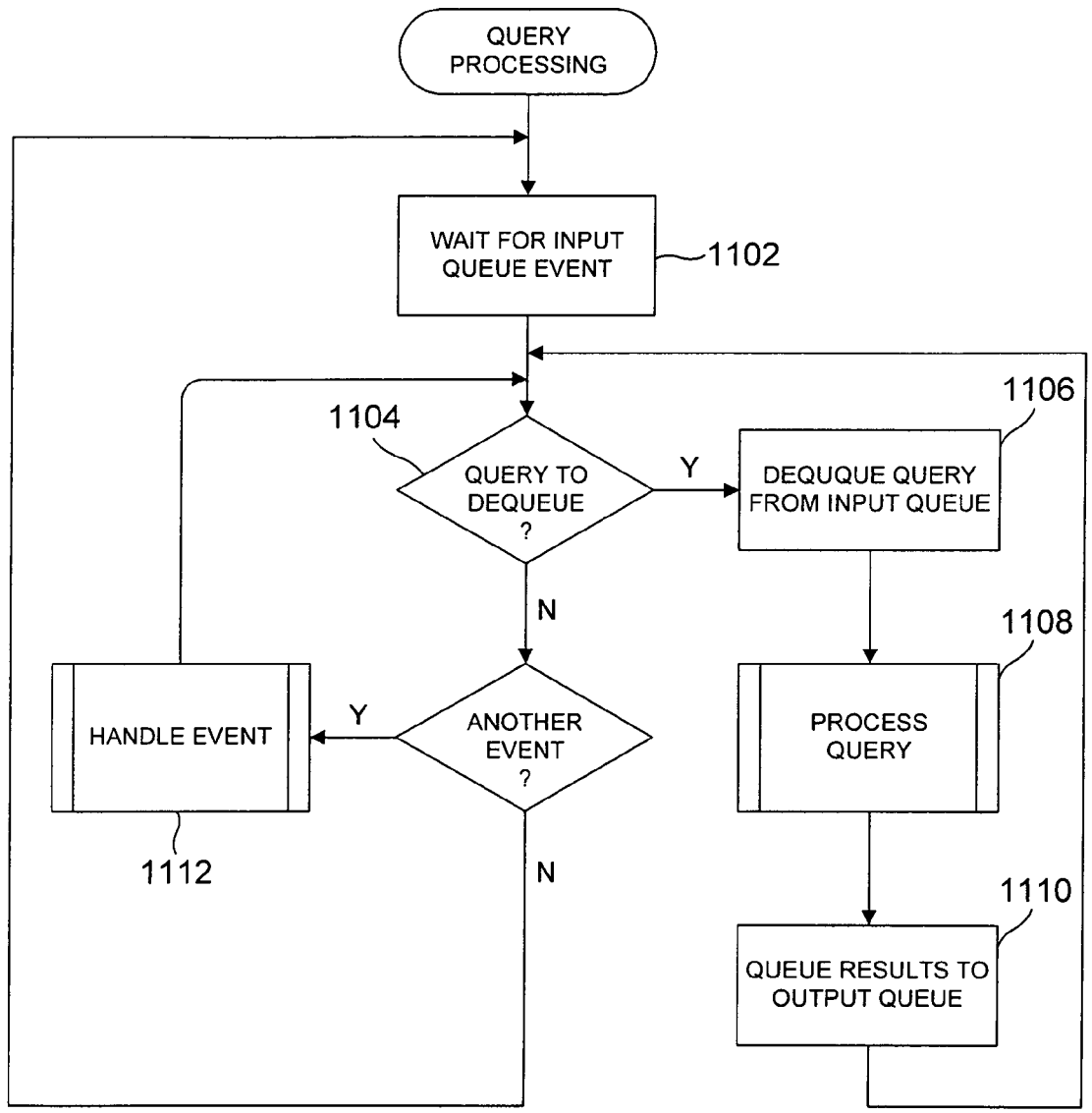
FIGS. 11A-F provide control-flow diagrams for an optimal-query-plan caching system within a database management system that represents one embodiment of the present invention.

FIG. 11A is a high-level control-flow diagram for a database-management-system query-processing subsystem. The query-processing subsystem is described, in FIG. 11A, as an event loop. In step 1102, the query-processing system waits for a next input-queue event, which awakens event-loop processing. When there is a query to dequeue from the input queue, as determined in step 1104, then, in step 1106, the query-processing subsystem dequeues the query from the input queue, processes the query in step 1108, and queues results from query processing to the output queue in step 1110. All other events, not relevant to current discussion, are handled by a default event handler 1112.

Figure 11B:
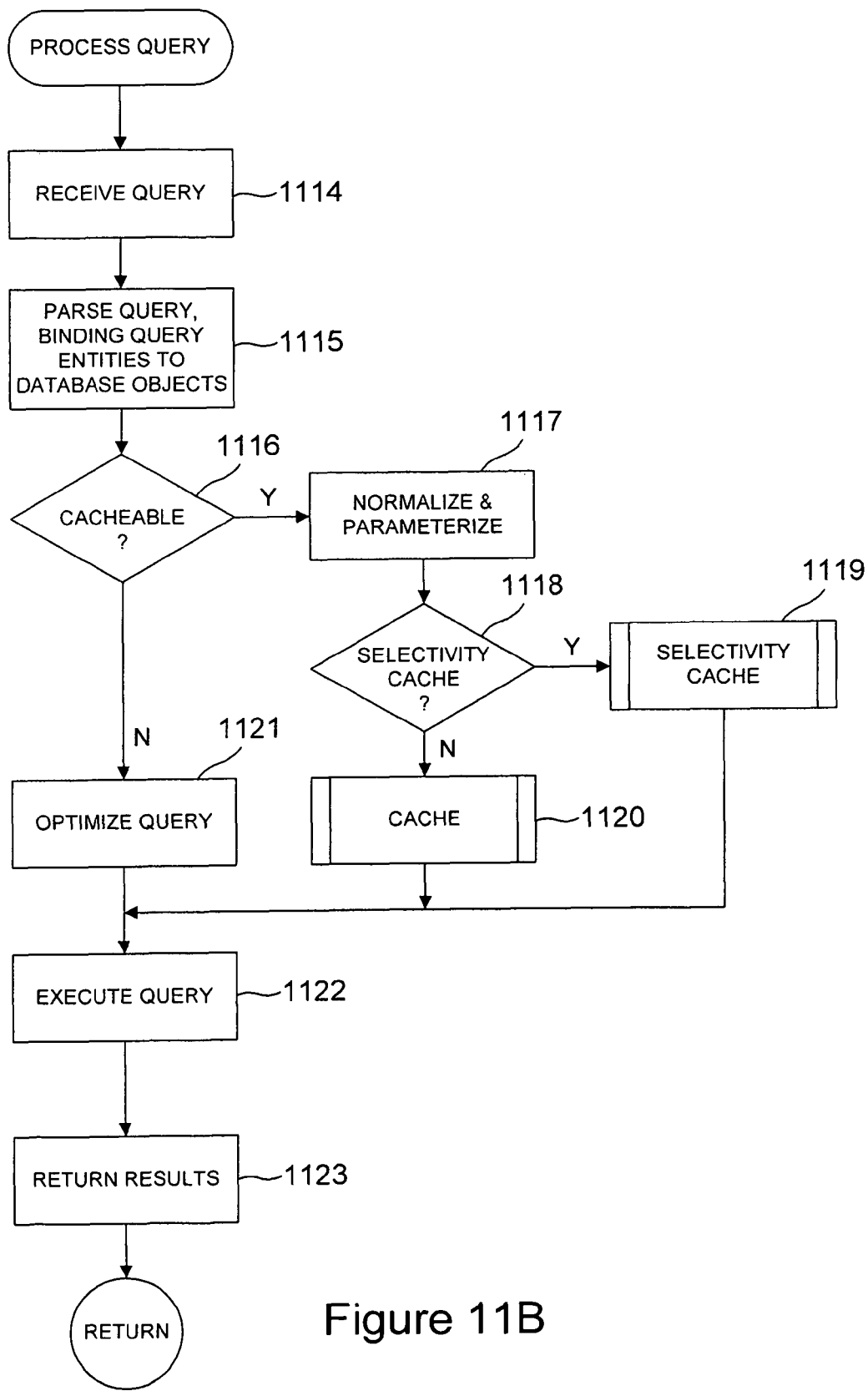

FIG. 11B provides a control-flow diagram for the routine "process query" called in step 1108 of FIG. 11A. In step 1114, the dequeued query is received by the routine "process query." In step 1115, the query is parsed, bound to database objects, transformed into an initial query plan, and otherwise prepared for a subsequent optimization step. In step 1116, the routine "process query" determines whether or not the query plan is cacheable. Certain complex, likely-not-to-be-repeatedly encountered query plans may not be cached, by database management systems, according to certain embodiments of the present invention. For example, in database management systems that handle both complex, business-intelligence and analytical-systems queries, which generate query plans having complex predicates and multiple literals and which frequently are executed only once, as well as simple on-line-transaction-processing queries, which are frequently executed and which are amenable to selectivity-based caching. In certain embodiments of the present invention, complex query plans that are unlikely to be executed more than once are not cached. When the query plan is deemed cacheable, then, in step 1117, the query plan is normalized and parameterized. In step 1118, the routine "process query" determines whether or not the query plan is amenable to selectivity-based caching. As discussed above, query plans for which predicate selectivity can be confidently estimated as a scalar value are amenable to selectivity-based caching, while other query plans are not. In the case that the normalized and parameterized query plan is amenable to selectivity-based caching, then the routine "selectivity cache" is called in step 1119. Otherwise, the routine "cache" is called in step 1120. When a query plan is not cacheable, the query plan is optimized in an optimization step 1121. In all cases, the optimized query plan corresponding, to the received query is executed, in step 1122, and the results are returned in the step 1123.

Figure 11C:
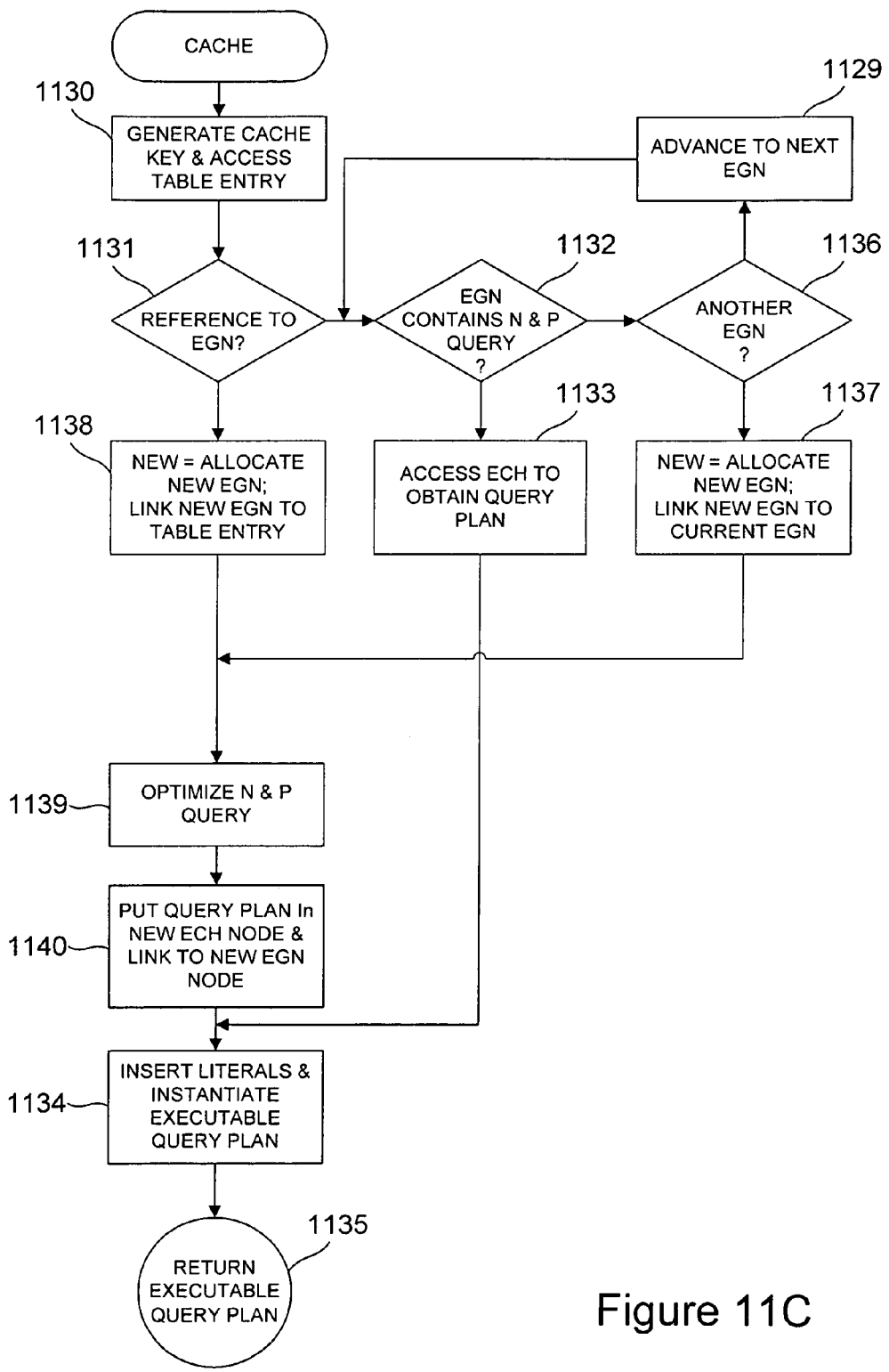

FIG. 11C illustrates the routine "cache," called in step 1120 of FIG. 11B. In step 1130, the routine "cache" generates a cache key from the received normalized and parameterized query plan and accesses the cache-key table (1002 in FIG. 10) to obtain a reference to an egn representing the equivalence group for the normalized and parameterized query plan. When a reference to an egn is obtained from the table, as determined in step 1131, then, in step 1132, the routine "cache" determines whether the egn contains the normalized and parameterized query plan received by the routine "cache." When the reference egn does contain the same normalized and parameterized query plan as that received by the routine "cache," then, in step 1133, the routine "cache" accesses the ecn referenced by the egn to obtain an optimized query plan and then, in step 1134, inserts literals into the obtained query plan, carries out any post-optimization steps, and otherwise instantiates the optimized query plan retrieved from the ecn as an executable query plan, which is returned in step 1135. When the first ecn does not contain the same normalized and parameterized query plan that is received by the routine "cache," then, in steps 1136 and 1129, the routine "cache" continues to access egns in a link list of egns, in the case that there have been cache-key collisions with respect to the cache key generated from the normalized and parameterized query plan. When no egn containing the received normalized and parameterized query plan is found, then a new egn is allocated for the normalized and parameterized query plan, in step 1137, and the new egn is appended to the list of egns referenced by the entry of the cache-key table accessed in step 1130. When the cache-key entry contains no reference to an egn, as determined in step 1131, then a new, first egn is allocated and linked by reference to the cache-key table entry in step 1138. In both cases that an optimized query plan has not been cached previously for the parameterized and normalized query plan, the normalized and parameterized query plan is optimized, in step 1139 and placed, in step 1140, into a new ecn that is linked to the new egn node allocated for the received normalized and parameterized query plan. Then, control flows to step 1134, as described above.

Figure 11D:
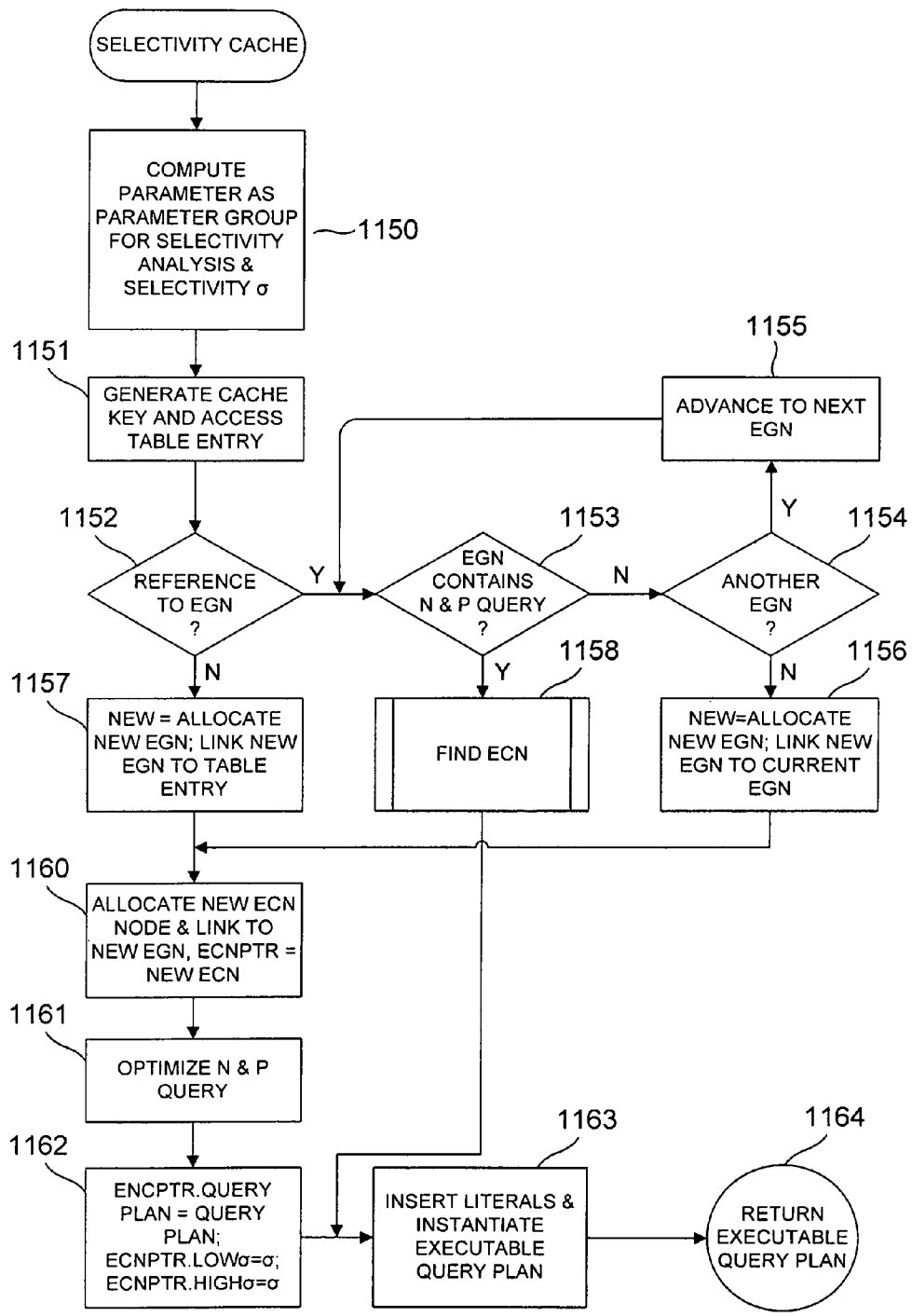

FIG. 11D provides a control-flow diagram for the routine "selectivity cache," called in step 1119 of FIG. 11B. In step 1150, the routine "selectivity cache" analyzes the received normalized and parameterized query plan to determine which literal or group of literals is to be considered for predicate selectivity and computes a selectivity σ for the query plan using those literals in the context of the query that was compiled to produce the received normalized and parameterized query plan. Steps 1152-1157 are identical to steps 1131-1138 in FIG. 11C. In these steps, the routine "selectivity cache" attempts to find the equivalence group node corresponding to the received normalized and parameterized query plan and, when no such egn is found, allocates a new egn for the received normalized and parameterized query plan. When an equivalence group has already been created for the received normalized and parameterized query plan, then, in step 1158, the routine "find ecn" is called to obtain the optimized query plan for the received normalized and parameterized query plan. When no equivalence group is found, a new egn is allocated for the received normalized and parameterized query plan. Then, in step 1160, a new ecn node is allocated and linked to the new egn prepared for the received normalized and parameterized query plan and, in step 1161, the received normalized and parameterized query plan is optimized. The optimized query plan produced in step 1161 is stored in the new egn node, in step 1162, and both lawns and high are set to the computed selectivity σ. In step 1163 literals are inserted into the normalized and parameterized query plan, post-optimization is carried out, and the optimized query plan is instantiated to produce an executable query plan, which is returned in step 1164.

Figure 11E:
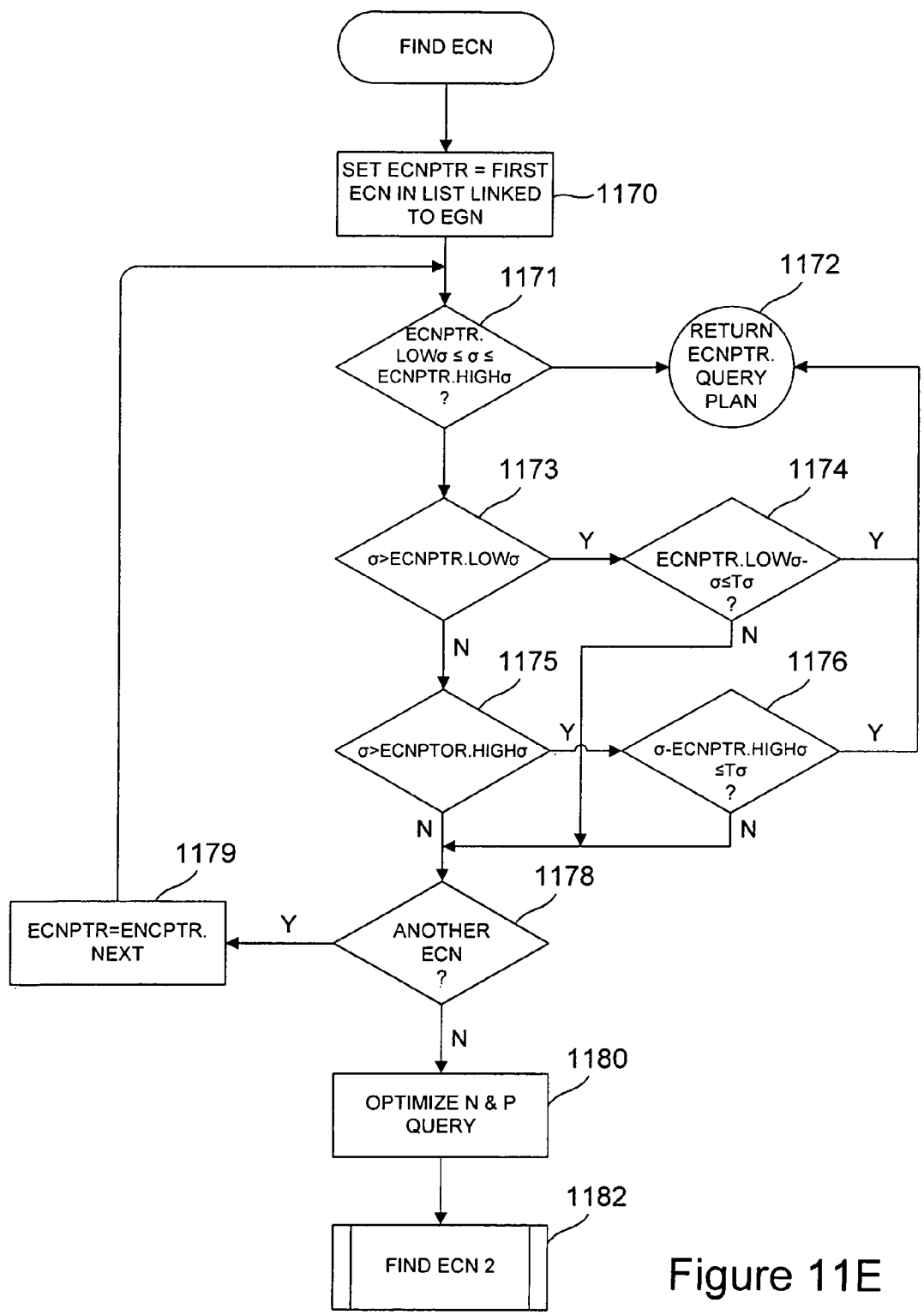
Figure 11F:
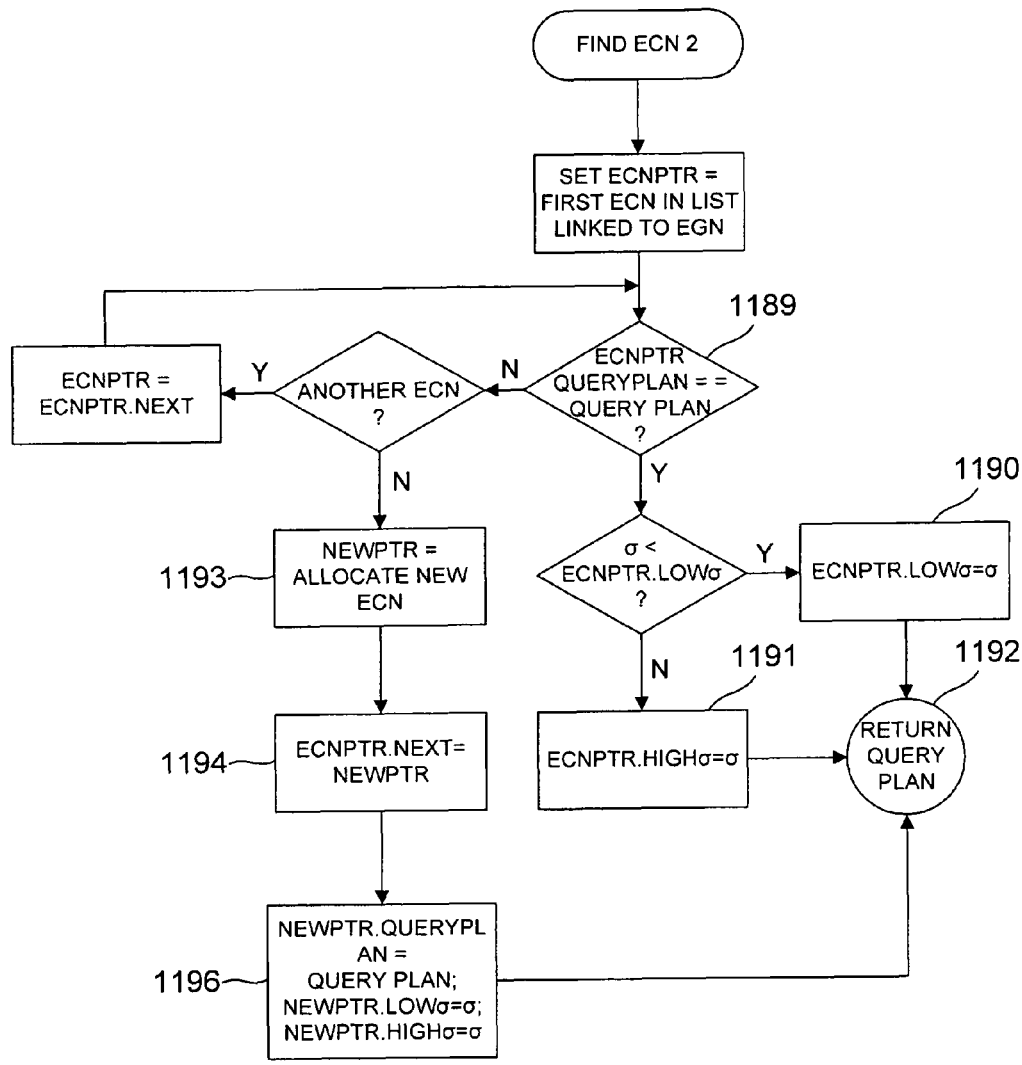

FIGS. 11E-F provide a control-flow diagram for the routine "find ecn" called in step 1158 of FIG. 11D. In step 1170, the variable ecnptr is set to reference the first ecn referenced by the egn corresponding to the normalized and parameterized query plan received in step 1150 by the routine "selectivity cache." The variable ecnptr points to successive ecns in a traversal of all of the equivalence classes associated with the egn that represents the normalized and parameterized query plan received by the routine "selectivity cache." When the computed selectivity σ for the received normalized and parameterized query plan falls within the lowσ& to-highσ selectivity range, as determined in step 1171, where lowσ and highσ specify the selectivity range that defines the currently considered equivalence class, then the optimized query plan stored in the currently considered ecn is returned, in step 1172, as the optimized query plan for the received normalized and parameterized query plan. Otherwise, as determined in step 1173, when the computed selectivity has a lower magnitude than lowσ for the currently considered equivalence class, then, in step 1174, when the computed selectivity is within a threshold distance to lowσ for the equivalence class, the optimized query plan contained in the currently considered ecn is returned, in step 1172, as the optimized query plan for the received normalized and parameterized query plan. In other words, when the selectivity computed for the received normalized and parameterized query plan is close to the lower selectivity lowσ of the selectivity range that defines the currently considered equivalence class, then the received normalized and parameterized query plan is considered to belong to the currently considered equivalence class. Similarly, when the computed selectivity is greater than highσ for the currently considered equivalence class, as determined in step 1175 then, in step 1176, when the computed selectivity is within a threshold distance of highσ for the currently considered equivalence class, the query plan contained in the currently considered ecn is returned, in step 1172, as the optimized query plan.

Otherwise, when there are additional ecns to consider, as determined in step 1178, the variable ecnptr is set to the ecn referenced by the currently considered ecn, in step 1179, and flow returns to step 1171. In an alternative version of the routine "find ecn," an initial traversal of the ecn list may be made to determine whether or not the selectivity range that defines any ecn contains the computed selectivity σ, and, only in the case that no equivalence class with a selectivity range that includes the computed selectivity σ can be found, threshold analysis is used, in a second pass or traversal through the ecns to find an equivalence class that can be expanded to include the computed selectivity σ. The implementation illustrated in FIG. 11E presumes that in general, it is not likely that a computed selectivity will be outside, but within a threshold distance, of the selectivity range that defines one equivalence class and within the selectivity range that defines another equivalence class. When no optimized query plan can be found in the already constructed equivalence classes, them in step 1180, the received normalized and parameterized query plan is optimized, and the second part of the routine "find ecn" is undertaken in step 1182.

FIG. 11E, and FIG. 11F, illustrate a single-predicate, single-literal case involving a single selectivity value for each query. In alternative embodiments of the present invention, multiple selectivity values, in a sector of selectivity values, are compared to stored selectivity values in an additional, inner loop.

The second part of the routine "find ecn" is provided in FIG. 11F. In this portion of the routine "find ecn," the linked list of ecn nodes is again traversed in order to determine whether the optimized query plan, produced in FIG. 1180, matches the optimized query plan contained in any of the currently existing ecns. When an existing ecn is determined to contain the optimized query plan, in step 1189, then the selectivity range that defines the equivalence class is expanded, in either of steps 1190 or 1191 and the optimized query plan is returned in step 1192. Otherwise, a new equivalence class is constructed by allocating a new ecn node, in step 1193, appending the new ecn node to the list of ecn nodes, in step 1194, and initializing the new ecn node, as discussed previously with respect to step 1162 in FIG. 11D, in step 1196.

Although the present invention has been described in terms of particular embodiments, it is not intended that the invention be limited to these embodiments. Modifications will be apparent to those skilled in the art. For example, a variety of different implementations of embodiments of the present invention can be developed by varying any of various different design and implementation parameters, including employing any of various programming languages, operating systems, modular organizations, control structures, and data structures, and/or by varying other such parameters. Although specific data structures for the optimized query plan cache are described with reference to FIG. 10, these data structures represent only one way to organize the cache. Alternative organizations may be simpler and more efficient under certain conditions, including storing equivalence-group and equivalence-class representations in simple records stored in memory blocks. The selectivity thresholds used in threshold analysis may vary, from implementation to implementation, may vary for different types of queries, and may vary dynamically, as the system self-adjusts to optimize caching efficiency. In alternative embodiments, dimensions in addition to predicate selectivity may used for optimized-query-plan caching.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optimized-query-plan caching subsystem within a query-processing computer system, the optimized-query-plan caching subsystem comprising:
   an optimized-query-plan cache contained in electronic memory of a computer system or distributed across one or more electronic memories and mass-storage devices within a computer system; and a caching component that executes within the query-processing computer system and that stores optimized query plans in the optimized-query-plan cache in association with a representation of an equivalence group and in association with a representation of an equivalence class contained within the equivalence group, and that retrieves optimized query plans from the optimized-query-plan cache by:
  receiving a query plan and a predicate selectivity computed for the query plan;
  determining whether an equivalence group for the query plan is stored in the optimized-query-plan cache;
  when an equivalence group for the query plan is stored in the optimized-query-plan cache, traversing equivalence-class representations of equivalence class contained in the equivalence group to identify an equivalence class that corresponds to the received predicate selectivity computed for the query plan; and
  when an equivalence class that corresponds to the received predicate selectivity is identified, retrieving an optimized query plan stored in association with the equivalence class that has been identified,
wherein an equivalence class corresponds to the received predicate selectivity when:
  the received predicate selectivity is equal to a single predicate selectivity that defines the equivalence class;
  the received predicate selectivity is greater than or equal to a low predicate selectivity and less than or equal to a high predicate selectivity that together define the equivalence class;
  the received predicate selectivity is within a threshold distance of a single predicate selectivity that defines the equivalence class; or
  the received predicate selectivity is within a threshold distance of a low predicate selectivity or a high predicate selectivity that together define the equivalence class.

2. The optimized-query-plan caching subsystem of claim 1 wherein each equivalence-group representation stored in the optimized-query-plan cache represents a normalized and parameterized query plan.

3. The optimized-query-plan caching subsystem of claim 2 wherein each equivalence-class representation stored in the optimized-query-plan cache represents one optimized query plan produced by optimizing the normalized and parameterized query plan represented by the equivalence group that contains the equivalence class following replacement of parameters with literal values.

4. The optimized-query-plan caching subsystem of claim 3 wherein each equivalence-class representation stored in the optimized-query-plan cache is defined by a predicate selectivity or a range of predicate selectivities computed for queries that, when normalized and parameterized, are equivalent to the normalized and parameterized query plan represented by the equivalence group.

5. The optimized-query-plan caching subsystem of claim 4 wherein the caching component stores an optimized query into the optimized-query-plan cache by:
  receiving the optimized query plan and a predicate selectivity computed for the optimized query plan;
  determining whether an equivalence group for the optimized query plan is stored in the optimized-query-plan cache;
  when an equivalence group for the optimized query plan is not stored in the optimized-query-plan cache, creating an equivalence group for the optimized query plan, creating a first equivalence class for the optimized query plan defined by the predicate selectivity computed for the optimized query plan, and storing the optimized query plan in the first equivalence class;
  when an equivalence group for the optimized query plan is stored in the optimized-query-plan cache, traversing equivalence-class representations of equivalence classes contained in the equivalence group to identify an equivalence class that corresponds to the received predicate selectivity and, when an equivalence class that corresponds to the received predicate selectivity is not identified, adding a new equivalence class to the equivalence group and storing the optimized query plan in the new equivalence class.

6. The optimized-query-plan caching subsystem of claim 5 wherein an equivalence class corresponds to the received predicate selectivity when:
  the received predicate selectivity is equal to a single predicate selectivity that defines the equivalence class;
  the received predicate selectivity is greater than or equal to a low predicate selectivity and less than or equal to a high predicate selectivity that together define the equivalence class;
  the received predicate selectivity is within a threshold distance of a single predicate selectivity that defines the equivalence class; or
  the received predicate selectivity is within a threshold distance of a low predicate selectivity or a high predicate selectivity that together define the equivalence class.

7. A method for optimized-query-plan caching carried out within a query-processing computer system that includes an optimized-query-plan cache contained in electronic memory of the computer system or distributed across one or more electronic memories and mass-storage devices within the computer system, the optimized-query-plan caching method comprising:
  storing, by a caching component that executes within the query-processing computer system, optimized query plans in the optimized-query-plan cache in association with a representation of an equivalence group and in association with a representation of an equivalence class contained within the equivalence group, by, for an optimized query plan:
    receiving the optimized query plan and a predicate selectivity computed for the optimized query plan;
    determining whether an equivalence group for the optimized query plan is stored in the optimized-query-plan cache;
    when an equivalence group for the optimized query plan is not stored in the optimized-query-plan cache, creating an equivalence group for the optimized query plan, creating a first equivalence class for the optimized query plan defined by the predicate selectivity computed for the optimized query plan, and storing the optimized query plan in the first equivalence class;
    when an equivalence group for the optimized query plan is stored in the optimized-query-plan cache, traversing equivalence-class representations of equivalence classes contained in the equivalence group to identify an equivalence class that corresponds to the received predicate selectivity, and when an equivalence class that corresponds to the received predicate selectivity is not identified, adding a new equivalence class to the equivalence group and storing the optimized query plan in the new equivalence class; and
  retrieving, by the caching component, optimized query plans from the optimized-query-plan cache, wherein an equivalence class corresponds to the received predicate selectivity when:
- the received predicate selectivity is equal to a single predicate selectivity that defines the equivalence class;
- the received predicate selectivity is greater than or equal to a low predicate selectivity and less than or equal to a high predicate selectivity that together define the equivalence class;
- the received predicate selectivity is within a threshold distance of a single predicate selectivity that defines the equivalence class; or
- the received predicate selectivity is within a threshold distance of a low predicate selectivity or a high predicate selectivity that together define the equivalence class.

8. The method of claim 7 wherein each equivalence-group representation stored in the optimized-query-plan cache represents a normalized and parameterized query plan.

9. The method of claim 8 wherein each equivalence-class representation stored in the optimized-query-plan cache represents one optimized query plan produced by optimizing the normalized and parameterized query plan represented by the equivalence group that contains the equivalence class following replacement of parameters with literal values.

10. The method of claim 9 wherein each equivalence-class representation stored in the optimized-query-plan cache is defined by a predicate selectivity or a range of predicate selectivities computed for queries that, when normalized and parameterized, are equivalent to the normalized and parameterized query plan represented by the equivalence group.

11. The method of claim 10 wherein the caching component retrieves an optimized query plan from the optimized-query-plan cache by:
- receiving a query plan and predicate selectivity computed for the query plan;
- determining whether an equivalence group for the query plan is stored in the optimized-query-plan cache;
- when an equivalence group for the query plan is stored in the optimized-query-plan cache, traversing equivalence-class representations of equivalence class contained in the equivalence group to identify an equivalence class that corresponds to the received predicate selectivity; and
- when an equivalence class that corresponds to the received predicate selectivity is identified, retrieving an optimized query plan stored in association with the identified equivalence class.

12. The method of claim 11 wherein an equivalence class corresponds to the received predicate selectivity when:
- the received predicate selectivity is equal to a single predicate selectivity that defines the equivalence class;
- the received predicate selectivity is greater than or equal to a low predicate selectivity and less than or equal to a high predicate selectivity that together define the equivalence class;
- the received predicate selectivity is within a threshold distance of a single predicate selectivity that defines the equivalence class; or
- the received predicate selectivity is within a threshold distance of a low predicate selectivity or a high predicate selectivity that together define the equivalence class.

13. A query-processing computer system comprising:
- a query-receiving component that receives queries for processing;
- a query-compiler component that generates a query plan for each received query;
- a query-optimizer component that, when a suitable optimized cached query plan is available for a query plan, retrieves the optimized cached query plan for execution and otherwise optimizes the query plan;
- a query-plan execution component that executes optimized query plans;
- an optimized-query-plan cache contained in electronic memory or distributed across one or more electronic memories and mass-storage devices within the query-processing computer system; and
- a caching component that executes within the query-processing computer system and that stores optimized query plans in the optimized-query-plan cache in association with a representation of an equivalence group and in association with a representation of an equivalence class contained within the equivalence group, and that retrieves optimized query plans from the optimized-query-plan cache by:
  - receiving a query plan and a predicate selectivity computed for the query plan;
  - determining whether an equivalence group for the query plan is stored in the optimized-query-plan cache;
  - when an equivalence group for the query plan is stored in the optimized-query-plan cache, traversing equivalence-class representations of equivalence class contained in the equivalence group to identify an equivalence class that corresponds to the received predicate selectivity computed for the query plan; and
  - when an equivalence class that corresponds to the received predicate selectivity is identified, retrieving an optimized query plan stored in association with the equivalence class that has been identified, wherein an equivalence class corresponds to the received predicate selectivity when:
- the received predicate selectivity is equal to a single predicate selectivity that defines the equivalence class;
- the received predicate selectivity is greater than or equal to a low predicate selectivity and less than or equal to a high predicate selectivity that together define the equivalence class;
- the received predicate selectivity is within a threshold distance of a single predicate selectivity that defines the equivalence class; or
- the received predicate selectivity is within a threshold distance of a low predicate selectivity or a high predicate selectivity that together define the equivalence class.

14. The optimized-query-plan caching subsystem of claim 13 wherein each equivalence-group representation stored in the optimized-query-plan cache represents a normalized and parameterized query plan.

15. The optimized-query-plan caching subsystem of claim 14 wherein each equivalence-class representation stored in the optimized-query-plan cache represents one optimized query plan produced by optimizing the normalized and parameterized query plan represented by the equivalence group that contains the equivalence class following replacement of parameters with literal values.

16. The optimized-query-plan caching subsystem of claim 15 wherein each equivalence-class representation stored in the optimized-query-plan cache is defined by a predicate selectivity or a range of predicate selectivities computed for queries that, when normalized and parameterized, are equivalent to the normalized and parameterized query plan represented by the equivalence group.

* * * * *